United States Patent [19]

Riddle

[11] Patent Number: 4,876,010
[45] Date of Patent: Oct. 24, 1989

[54] WASTE TREATMENT CLEANER APPARATUS

[76] Inventor: Dana Riddle, 230 Pineland Dr., Smyrna, Ga. 30082

[21] Appl. No.: 252,117

[22] Filed: Oct. 3, 1988

[51] Int. Cl.[4] ............................................. B01D 23/00
[52] U.S. Cl. .................................... 210/525; 210/528; 210/800; 15/246.5; 134/32
[58] Field of Search ............... 210/523, 525, 528, 800, 210/529; 15/246.5; 134/32, 42

[56] References Cited

U.S. PATENT DOCUMENTS

| | | | |
|---|---|---|---|
| 1,951,462 | 3/1934 | Wing | 210/530 |
| 2,052,676 | 9/1936 | Tark | 210/525 |
| 2,122,383 | 6/1938 | Scott | 210/531 |
| 2,236,128 | 3/1941 | Poole | 210/530 |
| 3,338,419 | 8/1967 | Smith | 210/525 |
| 3,764,012 | 10/1973 | Böhnke et al. | 210/525 |
| 3,919,090 | 11/1975 | Shaffer | 210/525 |
| 4,830,748 | 5/1989 | Hall | 210/241 |

FOREIGN PATENT DOCUMENTS 57-41282 12/1979 Japan .
880178 10/1961 United Kingdom ............... 15/246.5

Primary Examiner—W. Gary Jones
Assistant Examiner—Matthew O. Savage
Attorney, Agent, or Firm—Thomas & Kennedy

[57] ABSTRACT

A cleaner apparatus for a sewage treatment tank has a rotatable arm which passes over the surface of the liquid in the tank. Articulated arms carrying scrubbing members are attached to the rotatable arm and biased to maintain the scrubbing members in contact with the surfaces to be cleaned. A fluid conduit means having a plurality of spray nozzles is carried by the arm, and the nozzles are positioned to direct a liquid spray on the surfaces to be cleaned.

12 Claims, 3 Drawing Sheets

WASTE TREATMENT CLEANER APPARATUS

This invention relates to a sewage treatment apparatus and, more particularly, to a method and apparatus for automatically cleaning a sewage treatment apparatus.

BACKGROUND OF THE INVENTION

Sewage treatment in general involves the use of clarifiers or settling tanks into which liquefied sewage is introduced. The solid matter suspended in the liquid settles to the bottom of the tank as sludge, and the top clarified. This clarified liquid is then introduced into a second tank so that there may be further precipitation of the solid matter, with a consequent further clarification of the liquid. Subsequent settling tanks continue to clear the liquid and collect the solid matter as sludge. Typical of such settling tanks with sludge collecting mechanisms are those shown in U.S. Pat. Nos. 1,951,462 of Wing, 2,122,383 of Scott, and 3,764,012 of Bohuke et al. The Bohuke et al apparatus is of interest in that the settling tank is divided into several compartments which perform the settling and clarification functions of a plurality of tanks.

Removal of the clarified effluent is generally accomplished by means of an annular trough formed by weirs which permit the clarified liquid to spill into the trough from which it is subsequently removed by suitable pipes or conduits. Such weir and trough arrangements are shown, for example, in U.S. Pat. Nos. 2,052,676 of York and 2,236,128 of Poole.

In settlement systems in general, and especially in such systems where a plurality of settling tanks are used, the liquid effluent still contains, after the first or second settling operation, large quantities of organic matter suspended therein. One consequence of the presence of such organic matter is the formulation of a scum which floats on the liquid and resists settling to the bottom. This scum can be removed by apparatuses such as that shown in U.S. Pat. No. 3,338,419 of Smith, which uses oar shaped paddles to impel the scum into collection pipes through which it is drained away.

Another, more serious, consequence of the presence of organic matter in the effluent is that such matter promotes the growth of algae at a rapid rate. Such algae builds up on the weir surfaces and on the surfaces of the settling tank itself. Such a buildup can result in clogging of the weir passages and the drain conduits of the system, as well as adding additional contaminants to the effluent. In practice it has become necessary to scrub down the system periodically to remove accumulated algae and, in some cases, to shut down the system, drain the tanks, and scrub them out. Such procedures are time consuming, labor intensive, expensive, and unpleasant for those who have to scrub the tanks.

While it is virtually impossible to prevent the formation of algae, it is highly desirable that such algae formation and growth be controlled to the extent that the frequency of system shut down is materially reduced.

SUMMARY OF THE INVENTION

The present invention is directed to an apparatus and method of controlling the growth of algae on the surfaces of a sewage settling tank so that system shut down is reduced to a minimum.

The apparatus of the invention, in one preferred embodiment thereof, comprises a circular cylindrical tank into which liquefied sewage is introduced. The tank is provided with a sloping bottom, such as is shown in, for example, the Scott patent, so that the precipitated sludge may be forced toward the bottom center of the tank from which it may be removed by any suitable means. Centrally located within the tank is an upstanding pedestal upon which is mounted a rotatable member. Intermediate the center of the tank and its outer wall is located an annular effluent drain channel formed by weirs which permit surface effluent to spill into the channel from which it is drained away.

Mounted on the rotatable member at a point removed from the rotational center thereof is rigid sweep arm which extends above the surface of the liquid toward the outer wall of the tank. As the rotatable member rotates, the arm is forced to rotate with it so that it passes across the entire surface in one revolution of the rotatable member. Located between the drain channel and the rotatable member is a skimmer barrier which is concentric with the rotatable member and functions to prevent scum, leaves, and other debris from impinging on the weirs. Mounted to the sweep arm at a position adjacent the skimmer barrier is a skimmer member which, as the sweep arm rotates, skims the scum and other debris ahead of it so that such debris may be readily removed. Because the sweep arm is mounted to the rotatable member at a point removed from the rotational axis, it forms an angle with the radius extending from the center to the distal end of the sweep arm, thus the skimmer is also at an angle to the radius. This angular orientation tends to force scum and debris toward the skimmer barrier so that it is more easily collected.

Mounted on the sweep arm at a point between the skimmer barrier and the inside weir is pivoting, spring-loaded arm which carries at its distal end, a heavy brush. The spring loaded arm is pivotally mounted to the sweep arm so that is pivotable both vertically and horizontally. The spring loading forces the scrub brush against the exterior surface of the inside weir so that, as the sweep arm moves, the brush scrubs algae and other deposits from that surface of the weir. Also mounted on the sweep arm at the distal end thereof is a second spring-loaded arm having a scrub brush mounted on its distal end. This second arm is also so mounted as to be pivotable both vertically and horizontally. The spring loading forces the scrub brush against the outer surface of the outer weir so that this surface is scrubbed free of algae and other deposits as the sweep arm is rotated.

The effluent channel formed by the weirs is provided with a drain which extends through the exterior wall of the tank. To prevent the brush being carried by the exterior pivot arm from jamming against this drain, a sloping ramp is located over the drain which forces the brush to ride up and over the drain, and then return to its scrubbing position. Stop means mounted on the sweep arm prevent both pivot arms from dropping below their sweep positions.

A third scrub brush is mounted to the skimmer and positioned to scrub the outer surface of the skimmer barrier. To facilitate the scrubbing operation, the sweep arm is provided with a fluid spray mechanism which directs a spray against the surfaces to be cleaned, thereby softening and loosening any deposits on these surfaces.

Inasmuch as the sweep arm is activated as soon as the tank is full, the scrubbing action of the brushes tends to inhibit the formation of algae on the submerged surfaces contacted by the brushes, hence algae build-up is materially reduced by keeping these surfaces clear. Even where there is algae build-up, the brushes remove major portions of it, hence the necessity of frequently shutting the system down to clear the tank is obviated.

The features and advantages of the present invention will be more readily understood from the following detailed description, read in conjunction with the accompanying drawings.

DETAILED DESCRIPTION

Figure 1:
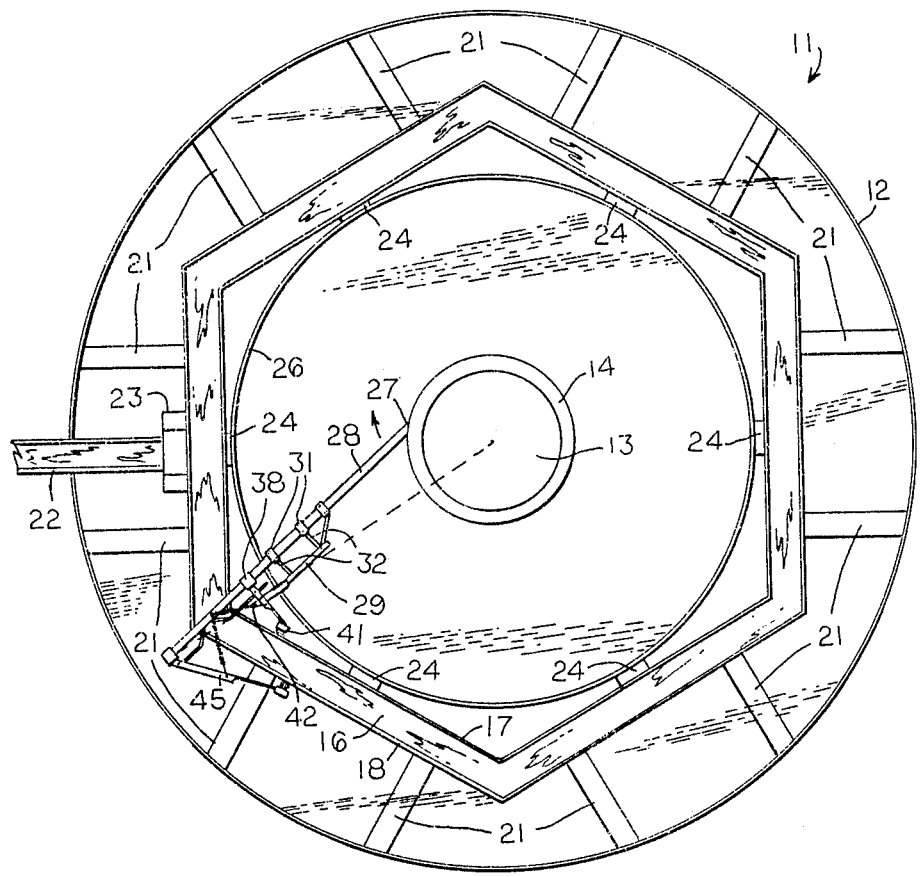
FIG. 1 is a plan view of a sewage settling tank embodying the cleaning system of the present invention.
Figure 2:
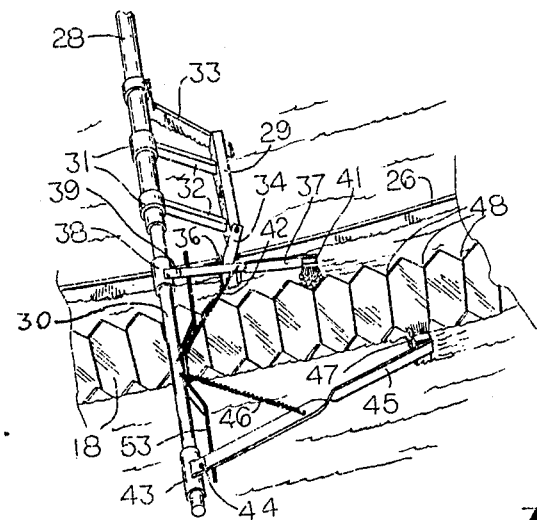
FIG. 2 is a perspective view of a detail of the cleaning arrangement of the present invention.

FIG. 1 depicts a settling tank 11 having an outer cylindrical wall 12 of any suitable material such as steel or concrete, a sloping bottom 15, and a centrally located post 13 having mounted thereon a rotatable member 14. Concentrically located between center post 13 and wall 12 is an effluent channel 16 formed by first and second weirs 17 and 18, to which is attached a bottom member 19, best seen in FIG. 4. As shown in FIG. 1, channel 16 is hexagonal in shape and is held in place by structural ribs 21, 21 attached to outer wall 12. Channel 16 is provided with a drain 22 extending through wall 12 through which drain the effluent passes. As will be discussed more fully hereinafter, a ramp 23, attached to the outer surface of weir 18, extends over drain 22 to protect it from, and to prevent it from impeding, the cleaning apparatus of the invention. Located inside of inner weir 17 and mounted thereto by members 24 is a skimmer barrier 26, concentric with post 13.

Figure 4:
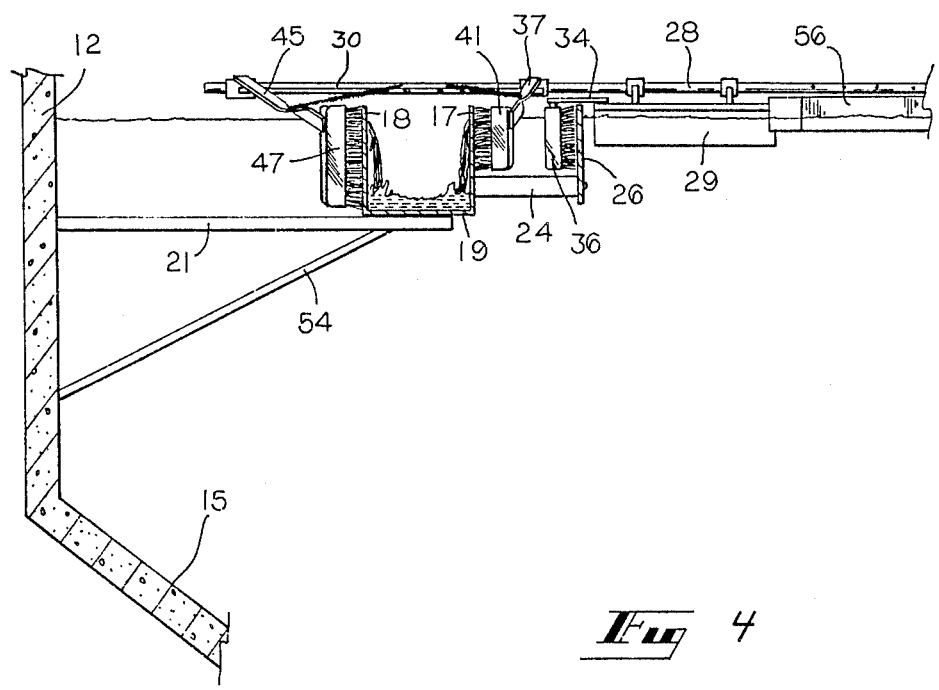
FIG. 4 is an elevation, sectional view of a portion of the settling tank illustrating the cleaning arrangement of the present invention.
Figure 5:
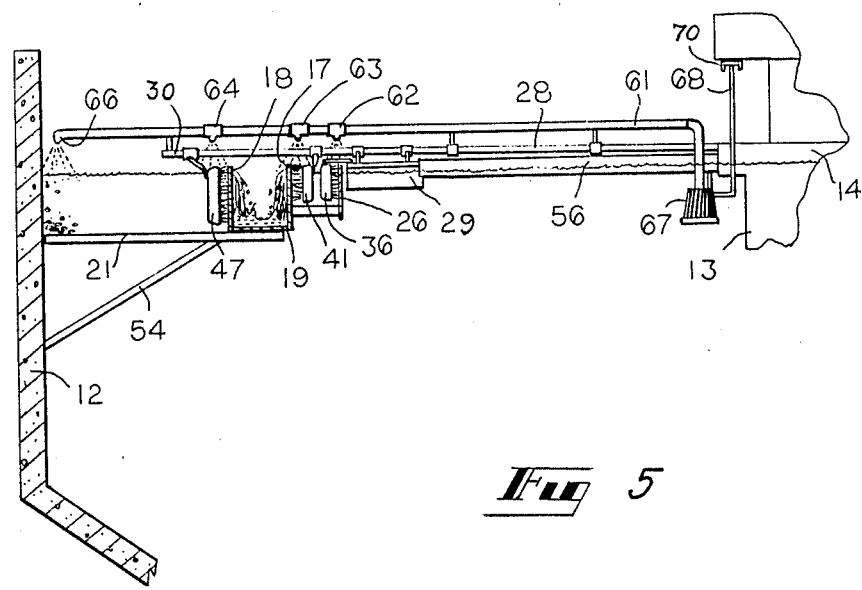
FIG. 5 is an elevation, sectional view illustrating the fluid spray mechanism of the present invention; and, FIG. 6 is a perspective view of the mounting arrangement of one of the pivot arms of the present invention.

Mounted to rotatable member 14 at a point 27 at the outer edge of member 14 is a sweep arm 28 which extends across the surface of the fluid in the tank from member 14, to a location near skimmer barrier 26, as best seen in FIGS. 1, 4, and 5. Member 14 is rotated by any suitable means, not shown, such as, for example, an electric motor mounted within post 13, or the entire post 13 may be made rotatable. Mounted on sweep arm 28 is a skimmer 29, located just inside of skimmer barrier 26. Skimmer 29 may be mounted to sweep arm 28 in any suitable manner such as by clamps 31, 31 and arms 32, 32. Skimmer 29 also can include an angular portion 33, extending between arm 28 and skimmer 29. As member 14 is rotated, arm 28 is likewise rotated in the direction of the arrow in FIG. 1. The mounting of arm 28 to member 14 is such that it forms an acute angle with a radius, shown in dashed lines, extending from the center of member 14 to the distal end of arm 28. As a consequence, debris and scum on the surface of the liquid in the tank is forced toward the skimmer barrier 26 and collects in the angle between skimmer 29 and barrier 26, from which it may readily be removed.

Mounted to the top of skimmer 29 is an arm 34 to the distal end of which is mounted a scrubbing brush 36 which bears against the exterior surface of barrier 26. As arm 28 and hence skimmer 29 are rotated, brush 36 scrubs the exterior surface of barrier 26.

An extension 30 is attached to arm 28 adjacent the skimmer barrier 26 and extends across channel 16 to a position adjacent wall 12. Extension 30 has attached thereto, at a position inside the inner weir 17, a first arm 37 pivotally clamped at one end to extension 30 by a sleeve clamp 38 which permits arm 37 to move in a vertical direction. Attached to clamp 38 is a pivot member 39 which permits arm 37 to move in a horizontal direction. Thus, the arm 37 since it is pivotable about two separate, displaced axes, can be described as being articulated. Mounted to the distal end of arm 37 is a scrubbing brush 41. A spring member 42, mounted between extension 30 and arm 37 biases brush 41 against the surface of weir 17 so that as arm 28 rotates, brush 41 cleans the surface of weir 17. In a similar manner, a second arm 45 is mounted adjacent the end of extension 30 by means of pivoting clamp 43 and pivot member 44, making arm 45 pivotable both horizontally and vertically and it is therefore articulated. A scrubbing brush 47 is mounted at the free end of arm 45 and is biased against the surface of weir 18, scrubbing it of algae and debris as arm 28 and extension 30 rotates.

Weirs 17 and 18 each consist of a plurality of elongated hexagonal shaped plates forming notches 48, 48 through which the liquid effluent spills into channel 16. As shown in FIG. 1, the channel is hexagonal in shape, although it may be of circular or other shape if desired. Regardless of the shape, the brushes 41 and 47 bear against the respective weir surfaces and because of the pivoting action of arms 37 and 45, and spring members 42 and 46, remain firmly against these surfaces regardless of the shape of channel 16.

Figure 3:
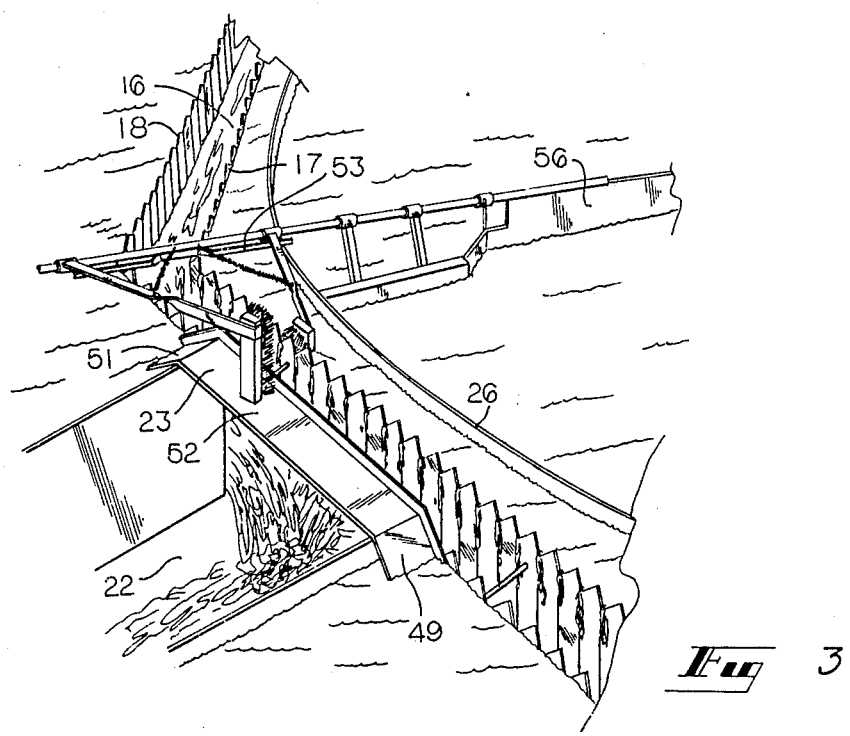
FIG. 3 is perspective view of a detail of the present invention showing the effluent channel drain and the brush deflecting ramp.

In FIG. 3 there is shown the drain arrangement for channel 16, and the operative feature of protective ramp 23. Drain 22 conducts water or effluent from channel 16 through a suitable opening (not shown) in weir 18. Ramp 23 has first and second sloped portions 49 and 51 and a flat portion 52 extending over drain member 22. As arm 28 rotates, brush 47 once every revolution encounters slope 49 and, because of the pivoting action of arm 45, rides up slope 49, across portion 52, and down slope 51, thereby preventing any interference between brush 47 and drain 22. Downward movement of both arms 37 and 45 is limited by a stop member 53 attached to extension 30.

In FIG. 4 there is shown a bracing member 54 for support member 21. Each of the support members 21 can be braced by a bracing member 54 to insure adequate strength of the assembly. In addition, there is shown in FIGS. 3 and 4 an additional skimmer plate 56. Attached to arm 28 which insures that surface debris or scum is swept toward skimmer 29.

A fluid sprinkler arrangement for spraying fluid against surfaces to be cleaned is shown in FIG. 5. Mounted on arm 28 is a fluid pipe or conduit 61 having a plurality of spray nozzles 62, 63, 64 located above skimmer barrier 26, weir 17, and weir 18, respectively. At the distal or free end of conduit 61 is a spray nozzle 66 for applying spray to the interior surface of wall 12. Fluid under pressure is supplied to conduit 61 by means of a submersible pump 67 which is mounted to rotatable member 14. A substantially rigid arm 68 carries an electrical cable, not shown, which operatively electrically couples with a track 70 mounted to the post 13 for supplying power to pump 67. In operation, the nozzles direct a fluid spray onto the surfaces of the barrier 26, weirs 17 and 18 in the vicinity of the brushes 36, 41 and 47. The spray softens and loosens algae and debris that may be clinging to these surfaces, thereby facilitating the cleaning process by insuring adequate removal of algae and debris. While pump 67 is shown as electrically driven, it is obvious that other types of pumps could also be used to accomplish the same end.

Figure 6:
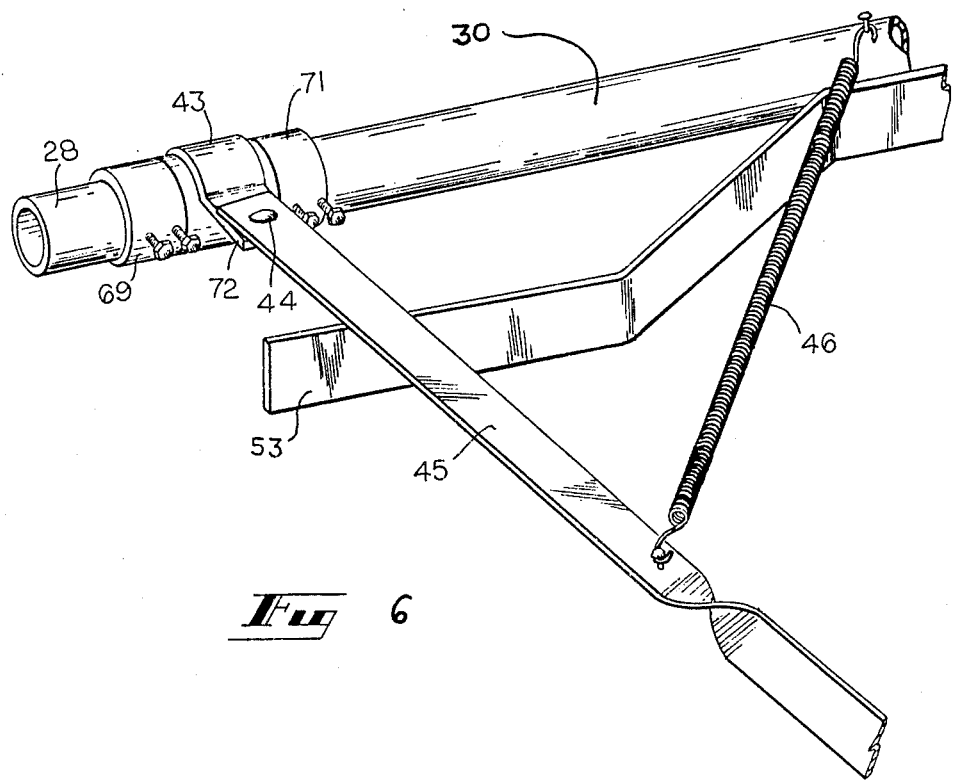

FIG. 6 illustrates the mounting arrangement of arm 45 in detail. The mounting arrangement for arm 37 is basically the same. A clamp member 43 is mounted on arm 28 and is free to pivot about the axis of arm 28. A pair of stop collars 69 and 71 are affixed to arm 28 and prevent clamp 43 from sliding along arm 28. Clamp 43 has a projecting tang 72 to which is mounted arm 45 by means of a pivot pin 44, making arm 45 pivotable about the vertical axis of pin 44. Bias is applied to arm 45 by means of spring 46, connected between arm 30 and arm 45 as shown. This mounting arrangement insures that the scrubbing brush carried by arm 45 bears against the surface it is intended to clean, and also the arrangement adapts to the presence of obstructions, such as ramp 23, without impairing the operation.

In operation, as the sweep arm 28 is swept through 360 degrees over the surface of the liquid in the tank by revolving means 14, scum and debris are forced toward the skimmer barrier 26 by plate 56 angle plate 33, and skimmer 29, from where the material may be collected by any suitable means, even by simply scooping it up. Arms 37 and 45 press their respective brushes 41 and 47 against the surfaces of weir 17 and 18 respectively, and brush 36 bears against the surface of barrier 26. Under the softening influence of the spray from nozzles 62, 63 and 64, the brushes remove most, if not all, accumulations of algae and debris. As was pointed out heretofore, the brushes actually tend to inhibit the growth of algae by keeping the surfaces clean from the start of the operation.

As arm 28 sweeps around, brush 47 encounters ramp 23 which forces it up and over the channel drain 22, thereby preventing any possible stoppage.

From the foregoing it can readily be seen that the method and apparatus of the present invention constitute a novel and much needed cleaning arrangement for sewage settling tanks and materially lengthen the period between tank shut down for cleaning.

The foregoing description of the features and details of the present invention has been in relation to a preferred embodiment thereof. It is readily apparent that various changes or alterations may be made to the mechanism illustrated and the method set forth without departure from the spirit and scope of the invention.

I claim:

1. For use in a settling tank having a substantially cylindrical outer wall, a centrally located rotatable member, an effluent channel having a plurality of surfaces with said channel being concentrically located with respect to the rotatable member between the rotatable member and the outer wall and drain means for the channel; cleaning means for cleaning at least one of the surfaces of the channel comprising:
   a sweep arm affixed to the rotatable member at one end and extending toward the outer wall of the tank along a longitudinal axis, said sweep arm having a distal end located adjacent the outer wall;
   a first cleaning member mounted on said sweep arm and extending toward the channel surface to be cleaned;
   biasing means for maintaining a portion of said cleaning member in contact with the surface to be cleaned during rotation of the rotatable member;
   said first cleaning member comprising a cleaner arm pivotally mounted at one end to said sweep arm and a scrubbing member mounted to the distal end of said cleaner arm, said scrubbing member being maintained in contact with the surface to be cleaned by said biasing means;
   said cleaner arm being pivotally mounted to said sweep arm by a clamp member adapted to move about the said longitudinal axis of said sweep arm.

2. The cleaning means as claimed in claim 1 wherein said clamp member includes a tang extending outwardly therefrom at an angle to said longitudinal axis to which said cleaner arm is pivotally attached by a pivot pin.

3. The cleaning means as claimed in claim 1 wherein said biasing means comprises a spring member extending between said sweep arm and said cleaner arm.

4. For use in a settling tank having a substantially cylindrical outer wall, a centrally located rotatable member, an effluent channel having a plurality of surfaces with said channel being concentrically located with respect to the rotatable member between the rotatable member and the outer wall and drain means for the channel; cleaning means for cleaning surfaces of the channel comprising:
   a sweep arm affixed to the rotatable member at one end and extending toward the outer wall of the tank along a longitudinal axis and having a distal end located adjacent the outer wall;
   a first cleaning member mounted on said sweep arm and extending toward a channel surface to be cleaned;
   biasing means for maintaining a portion of said first cleaning member in contact with the surface to be cleaned during rotation of the rotatable member;
   a second cleaning member mounted on said sweep arm and extending toward a second channel surface to be cleaned;
   second biasing means for maintaining a portion of said second cleaning member in contact with said second surface during rotation of said rotatable member;
   said second cleaning member comprising a cleaner arm pivotally mounted at one end to said sweep arm and a scrubbing member being maintained in contact with the second surface by said second biasing means;
   said cleaner arm being pivotally mounted on said sweep arm by a clamp member adapted to move about the longitudinal axis of said sweep arm.

5. The cleaning means as claimed in claim 4 wherein said clamp member includes a tank extending outwardly therefrom at an angle to said longitudinal axis to which said cleaner arm is pivotally attached by a pivot pin.

6. The cleaning means as claimed in claim 4 wherein said second biasing means comprises a spring member extending between said sweep arm and said cleaner arm.

7. A settling tank adapted to contain liquid and comprising an outer cylindrical wall and a centrally located rotatable member;
   an effluent channel located within said tank between said outer wall and said rotatable member with said effluent channel being concentric with respect to said rotatable member, said channel having a bottom and first and second side walls defining weirs;
drain means for draining effluent from said channel through said outer wall,
cleaner means mounted to said rotatable member, said cleaner means comprising a sweep arm extending from said rotatable member toward said outer wall along a longitudinal axis, said sweep arm being located above the surface of liquid contained in said tank;
a first cleaner member;
a second cleaner member;
mounting means for pivotally mounting each of said cleaner members to said sweep arm with said first cleaner member extending from said sweep arm toward said first side wall and said second cleaner member extending from said sweep arm toward said second side wall, said arms each having a vertical pivot axis and a horizontal pivot axis;
a first scrubbing member mounted on the end of said first cleaning member remote from said sweep arm and a second scrubbing member mounted on the end of said second cleaning member remote from said sweep arm; and
means for biasing said first and second cleaning members toward said first and second side walls, respectively, to cause said scrubbing member to bear against said first and second side walls.

8. A settling tank adapted to contain liquid and comprising an outer cylindrical wall and a centrally located rotatable member;
an effluent channel located within said tank between said outer wall and said rotatable member with said effluent channel being concentric with respect to said rotatable member, said channel having a bottom and first and second side walls defining weirs;
drain means for draining effluent from said channel through said outer wall;
cleaner means mounted to said rotatable member, said cleaner means comprising a sweep arm extending from said rotatable member toward said outer wall along a longitudinal axis, said sweep arm being located above the surface of liquid contained in said tank;
a first cleaner member pivotally mounted to said sweep arm and extending toward said first side wall of said channel,
a second cleaner member pivotally mounted to said sweep arm and extending toward said second side wall of said channel;
a first scrubbing member mounted on the end of said first cleaning member remote from said sweep arm and a second scrubbing member mounted on the end of said second cleaning member remote from said sweep arm;
means for biasing said first and second cleaning members toward said first and second side walls, respectively, to cause said scrubbing members to bear against said first and second side walls;
a barrier member concentrically located within said tank between said rotatable member and said effluent channel; and
liquid conduit means mounted to said sweep arm and extending about the length thereof and a plurality of spray nozzles in said conduit for directing liquid spray onto the first and second sides of said effluent channel and onto said barrier member.

9. The settling tank as claimed in claim 8 and further including a nozzle at the end of said conduit remote from said rotatable member adapted to direct a fluid spray onto said outer wall.

10. The settling tank as claimed in claim 8 and further including means for supplying liquid under pressure to said liquid conduit.

11. A settling tank adapted to contain liquid and comprising an outer cylindrical wall and a centrally located rotatable member;
an effluent channel located within said tank between said outer wall and said rotatable member with said effluent channel being concentric with respect to said rotatable member, said channel having a bottom and first and second side walls defining weirs;
drain means for draining effluent from said channel through said outer wall;
cleaner means mounted to said rotatable member, said cleaner means comprising a sweep arm extending from said rotatable member toward said outer wall along a longitudinal axis with said sweep arm being located above the surface of liquid contained in said tank;
a first cleaner member pivotally mounted to said sweep arm and extending toward said first side wall of said channel,
a second cleaner member pivotally mounted to said sweep arm and extending toward said second side wall of said channel;
a first scrubbing member mounted on the end of said first cleaning member remote from said sweep arm and a second scrubbing member mounted on the end of said second cleaning member remote from said sweep arm;
means for biasing said first and second cleaning members toward said first and second side walls, respectively, to cause said scrubbing members to bear against said first and second side walls; and
ramp means positioned over said drain means, said ramp means being adapted to guide said first cleaner member past said drain means.

12. In a waste water clarifier of the type that includes a substantially cylindrical outer wall, a central member, an effluent channel concentrically located with respect to the central member between the central member and the outer wall, and drain means extending from the effluent channel, a method of cleaning algae from at least one surface of the effluent channel, said method comprising the steps of:
(a) providing a sweep arm extending from the central member to a position adjacent the effluent channel;
(b) providing a cleaner member pivotally attached at one end to the sweep arm and bearing a scrubbing member;
(c) biasing the scrubbing member into engagement with a surface of the effluent channel;
(d) rotating the sweep arm about the central member to move the scrubbing member in a path across the surface of the effluent channel; and
(e) displacing the scrubbing member from its path as it moves past the drain means.

* * * * *